United States Patent
Makinson et al.

(10) Patent No.: US 6,971,023 B1
(45) Date of Patent: Nov. 29, 2005

(54) AUTHORIZING AN ADDITIONAL COMPUTER PROGRAM MODULE FOR USE WITH A CORE COMPUTER PROGRAM

(75) Inventors: Graham Arthur Makinson, Oxford (GB); Daniel Joseph Wolff, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 629 days.

(21) Appl. No.: 09/678,689

(22) Filed: Oct. 3, 2000

(51) Int. Cl.$^7$ .............................................. H04L 9/00
(52) U.S. Cl. ...................... 713/193; 713/170; 713/176; 713/187; 713/188; 713/191; 380/255; 717/168
(58) Field of Search ................ 713/202, 170, 713/176, 187, 188, 191, 193, 200; 380/255; 717/168

(56) References Cited

U.S. PATENT DOCUMENTS

| | | | | |
|---|---|---|---|---|
| 5,113,518 A | * | 5/1992 | Durst et al. ................. 713/200 |
| 5,311,591 A | * | 5/1994 | Fischer ....................... 713/156 |
| 5,724,425 A | * | 3/1998 | Chang et al. ................. 705/52 |
| 5,933,503 A | * | 8/1999 | Schell et al. ................ 713/189 |
| 5,970,145 A | * | 10/1999 | McManis .................... 713/187 |
| 6,067,575 A | * | 5/2000 | McManis et al. ........... 719/313 |
| 6,108,420 A | * | 8/2000 | Larose et al. ................. 705/59 |
| 6,138,236 A | * | 10/2000 | Mirov et al. ................. 713/200 |
| 6,151,643 A | * | 11/2000 | Cheng et al. ................. 710/36 |
| 6,157,721 A | * | 12/2000 | Shear et al. ................. 380/255 |
| 6,618,855 B1 | * | 9/2003 | Lindholm et al. ........... 717/126 |
| 6,651,249 B2 | * | 11/2003 | Waldin et al. ............... 717/170 |

OTHER PUBLICATIONS

U.S. Appl. No. 09/678,691 by Smithson et al. filed on Oct. 3, 2000 titled "Scanning Computer Files For Unwanted Properties".*

* cited by examiner

Primary Examiner—Ayaz Sheikh
Assistant Examiner—Taghi T. Arani
(74) Attorney, Agent, or Firm—Zilka-Kotab, PC; Christopher J. Hamaty

(57) ABSTRACT

A system for scanning computer files for unwanted properties, such as containing computer viruses or being spam e-mail, allocates a priority to pending scan requests based upon the identity of a computer user associated with the scan request. In the case of a normal file access request, the computer user associated with the scan request may be the file access request or in the case of an on-demand scan, then the computer user associated with a particular scan request for a computer file may be the owner or creator of that computer file. In the case of scan requests associated with e-mails, the sender or recipient computer user may be used in the allocation of a priority level for the scan request.

21 Claims, 12 Drawing Sheets

AUTHORIZING AN ADDITIONAL COMPUTER PROGRAM MODULE FOR USE WITH A CORE COMPUTER PROGRAM

BACKGROUND OF THE INVENTION

1. Field of the Invention

This invention relates to the field of data processing. More particularly, this invention relates to the field of scanning computer files for unwanted properties, such as, for example, the presence of computer viruses or characteristics indicative of spam e-mail.

2. Description of the Prior Art

It is known to provide computer systems that computer files for computer viruses or properties indicative of spam e-mail. These known systems have settings which control which files are scanned (e.g. for virus protection, all files or possibly just executable files) and which tests are applied.

As the volume of computer data files requiring scanning for unwanted properties increases, this task requires more processing resources. This is further compounded by the fact that the number of computer viruses for which it is desired to scan or the number of characteristics of spam e-mail for which it is desired to test are also ever increasing. In this context, measures which can make the scanning of computer files for unwanted properties more efficient are strongly advantageous.

SUMMARY OF THE INVENTION

Viewed from one aspect the present invention provides a method of detecting computer files having one or more unwanted properties, said method comprising the steps of:
- receiving requests to scan respective computer files together with data indicative of a computer user associated with respective requests to scan;
- storing within a store of pending scan requests data identifying said requests to scan together with data indicative of respective scan request priority levels for respective requests to scan, scan request priority level being dependent upon a computer user associated with a request to scan;
- selecting from said store of pending scan requests in dependence upon said data indicative of scan request priority level a next pending request to scan to be serviced; and
- scanning said next pending request to scan to be serviced to detect said one or more unwanted properties.

The invention recognises that as well as simply increasing the performance of the computer hardware for conducting such scanning for unwanted properties, advantages in overall efficiency can be gained by a more active approach to prioritising the scans to be conducted. In particular, there is a useful correlation between the computer user associated with a particular request to scan and a priority level that may be associated with that request to scan. As an example, a computer user such as the administrator of a computer network may be given higher priority to their scan jobs in order that their tasks may be completed more quickly and the overall efficiency of the computer network thereby improved. A further example might be a worker who depended upon having the most up to date information to perform their work and accordingly scanning their inbound e-mails should be given a high priority in order that they can receive any information these contain as rapidly as possible.

It will be appreciated that the store of pending scan requests could merely store data indicative of the computer user associated with a scan request and each time calculate the highest priority scan that should be selected from those pending in dependence upon the different computer users specified. However, this could result in a need to determine the priority levels on each occasion, which would be inefficient. Accordingly, in preferred embodiments of the invention a priority level associated with each request to scan is stored together with that request to scan within the store of pending scan requests.

One major field of application of the present invention is the scanning of file access requests to check the files concerned for computer viruses. Checking file access requests for computer viruses can consume large amounts of processing resource and delays in file access requests due to backlogs of pending scan requests can significantly degrade the performance of a computer system. Accordingly, the manner in which scan requests are prioritised can be highly significant.

A computer user who performs relatively processing non-intensive tasks, such as word processing, may be given a relatively low scan request priority as they access relatively few files and accordingly an extra delay upon each file access request they make has relatively little impact upon their efficiency. Conversely, a network administrator who may access many hundreds or thousands of computer files during their normal work may have their overall efficiency significantly degraded if each of those accesses is subjected to a significant delay to allow for scanning. Accordingly, preferred embodiments of the invention may prioritise the scanning to be performed subsequent to file access requests upon the basis of the computer user who originated that file access request.

Another type of request for scan can originate as a result of an on-demand scan. An on-demand scan may typically be run on a periodic basis to check all of the computer files stored on a system for unwanted properties, such as the presence of computer viruses, damage or corruption, or other characteristics indicative of undesirable material. In this context, the originator of the on-demand task will typically be the system administrator, but the files being examined will relate to all the different users. In practice, gains in effectiveness may be made by prioritising the on-demand scan requests in dependence upon who is the creator or owner of the files being scanned. In this way, files owned or created by users in highly critical roles may be given higher priority, as may users in roles with a high priority of suffering from files with unwanted properties, such as being infected by computer viruses.

As previously mentioned, the technique of the present invention may be applied to the detection of e-mails having unwanted characteristics, such as characteristics indicative of spam e-mails or e-mails containing words or content indicative of activity that is prohibited on the computer systems concerned, e.g. accessing pornographic or illegal material.

In this context of scanning e-mails, the invention may be equally utilised on both inbound and outbound e-mail messages to a system. It is possible that in different circumstances either inbound e-mail messages or outbound e-mail messages may be given generally higher priority in the allocation of the processing resources available for scanning.

In the context of scanning for spam e-mail, receipt within a predetermined period of more than a threshold level of e-mail messages having one or more common characteristics, such as a common sender, a common recipient, a common message title, a common message size, common attachment, a common attachment type or a common message content, may be used as a trigger to identify spam e-mail and then place an appropriate filter in place to block further receipt of such spam e-mail.

In order to allocate priority to the servicing of scan requests that would otherwise be given equal priority by the associated computer users, the store of pending scan requests may also include time stamp data indicative of the time at which a particular request to scan was issued. In this way, the oldest high priority pending scan request can be selected for service at each stage.

It is also possible that mechanisms may be used to promote in priority pending scan requests that have been unserviced for too long in order that a maximum level of latency is not exceeded.

Viewed from another aspect the present invention provides an apparatus for detecting computer files having one or more unwanted properties, said apparatus comprising:
a receiver operable to receive requests to scan respective computer files together with data indicative of a computer user associated with respective requests to scan;
a store of pending scan requests operable to store data identifying said requests to scan together with data indicative of respective scan request priority levels for respective requests to scan, scan request priority level being dependent upon a computer user associated with a request to scan;
selecting logic operable to select from said store of pending scan requests in dependence upon said data indicative of scan request priority level a next pending request to scan to be serviced; and
scanning logic operable to scan said next pending request to scan to be serviced to detect said one or more unwanted properties.

Viewed from a further aspect the present invention provides a computer program product carrying a computer program for controlling a computer to detect computer files having one or more unwanted properties, said computer program comprising:
receiver code operable to receive requests to scan respective computer files together with data indicative of a computer user associated with respective requests to scan;
storage code operable to store in a store of pending scan requests data identifying said requests to scan together with data indicative of respective scan request priority levels for respective requests to scan, scan request priority level being dependent upon a computer user associated with a request to scan;
selecting code operable to select from said store of pending scan requests in dependence upon said data indicative of scan request priority level a next pending request to scan to be serviced; and
scanning code operable to scan said next pending request to scan to be serviced to detect said one or more unwanted properties.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
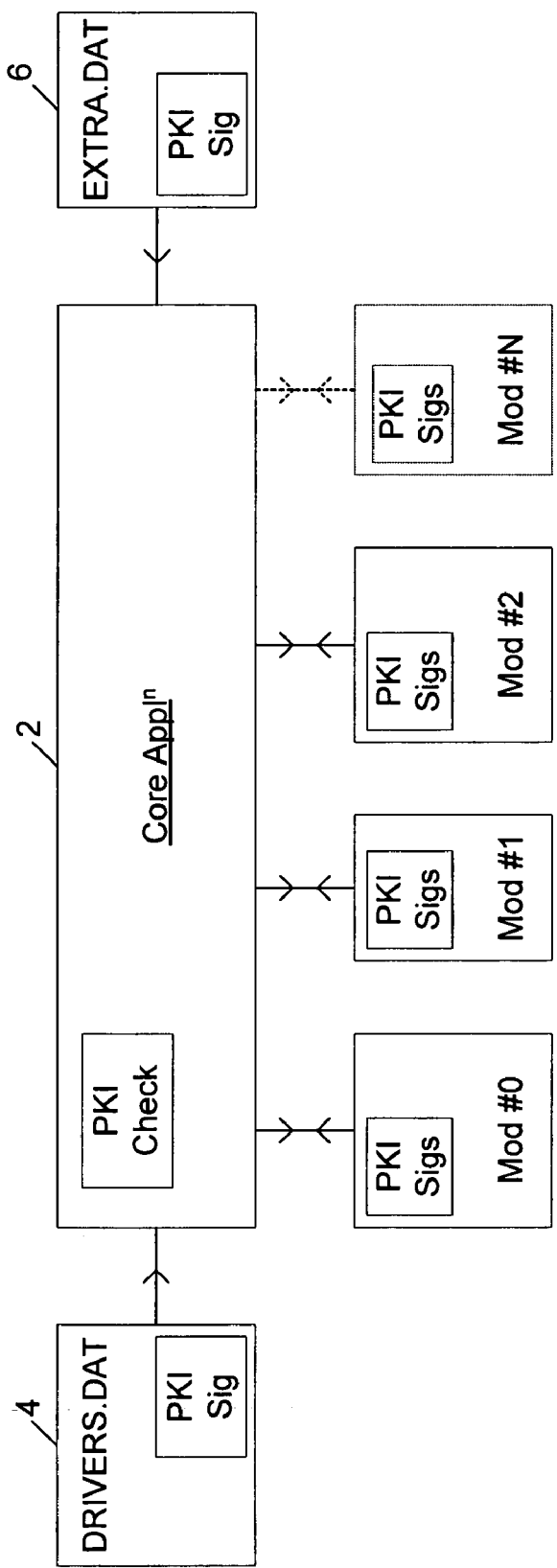
FIG. 1 schematically illustrates a system for performing anti-virus scanning upon file access requests.

FIG. 1 illustrates an anti-virus system for scanning file access requests issued by computer users to computer files stored upon a hard disk drive 2. Access to the hard disk drive 2 is controlled by an operating system file service 4 that receives file access requests from file requesting processes 6. The file access request from the file requesting processors 6 will be identified as associated with a particular computer user. Within the operating system file service 4, the file access requests are intercepted and redirected to an anti-virus system 8. The anti-virus system 8 is passed the file to which access has been requested together with data identifying the owner of that file, the creator of that file (if different from the owner) and the requester who originated the file access request, as well as other information. The owner and creator information may be stored upon the hard disk drive 2 in association with the computer files concerned by the normal operation of the operating system.

The anti-virus system 8 then performs anti-virus scanning and detection upon the file passed to it using virus definition data 10 and returns a pass or fail result to the operating system file service 4. If a pass is achieved, then access to the file concerned is granted to the file requesting process 6 and processing continues in the normal way.

It will be appreciated that on a busy computer system, many file access requests will be being processed simultaneously and the anti-virus system 8 can be used to manage the prioritisation of pending anti-virus scan requests.

Figure 2:
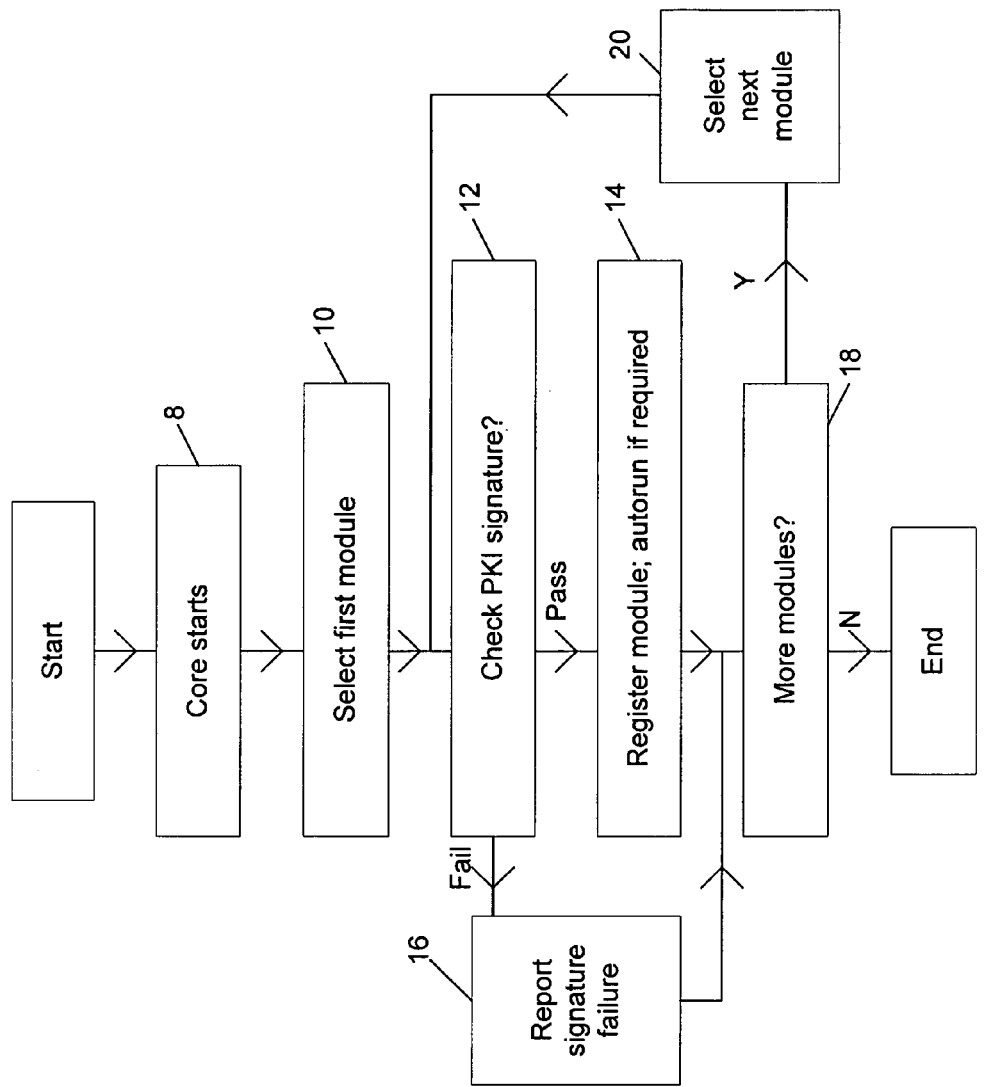
FIG. 2 is a flow diagram illustrating the allocation of a priority level for file access requests.

FIG. 2 is a flow diagram illustrating the allocation of a priority level by the anti-virus system 8. At step 10 a file access request is received from the operating system file service 4. At step 12 a check is made as to whether the file access request is the result of an on-demand scan or is a result of normal operation of the computer system.

In the case of an on-demand scan, processing proceeds to step 14 at which a priority level is allocated based upon the identity of the owner or creator of the file concerned. A pre-existing list of priority levels associated with different users is accessed by the anti-virus system 8. This list of priority levels associated with different users may be configured by the system administrator in accordance with the particular environment of the computer system concerned.

If the check at step 12 indicates that the file request is not the result of an on-demand scan, then step 16 serves to allocate a priority level to the file access request upon the basis of the identity of the requester.

After both steps 14 and 16, processing proceeds to step 18 at which the file access request is written to a store of pending scan requests together with the allocated priority level and a time stamp indicating the time at which the file access request was issued.

Figure 3:
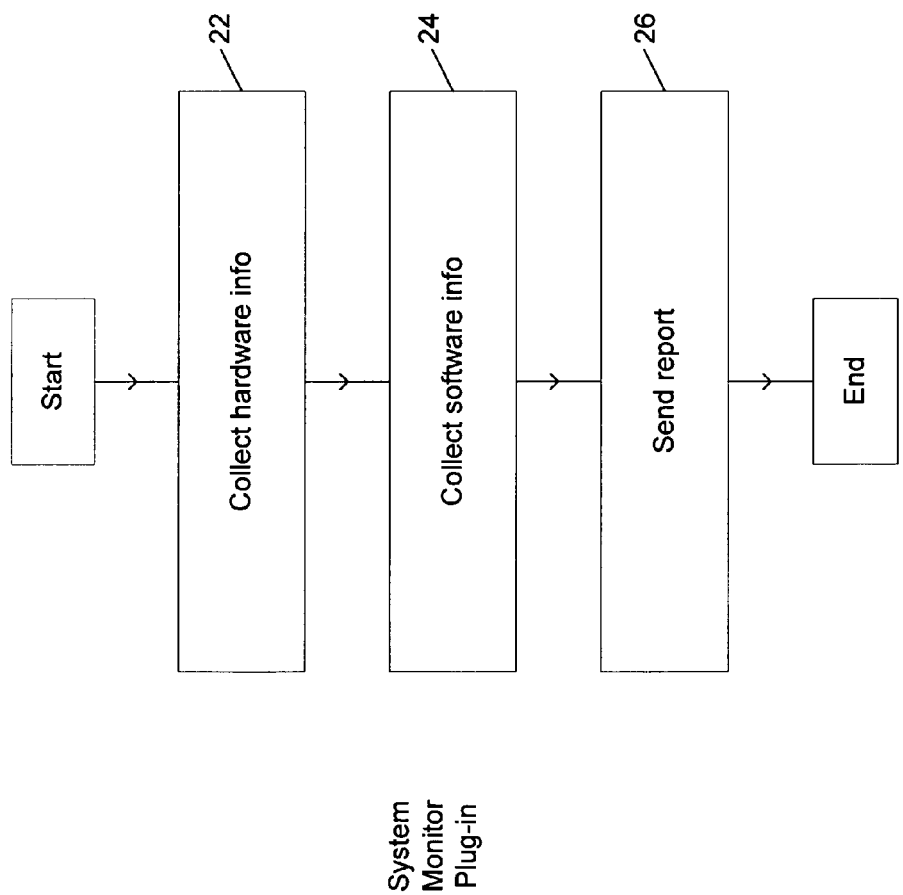
FIG. 3 schematically illustrates the contents of a store of pending scan requests resulting from file accesses within the system of FIG. 1.

FIG. 3 is an example of the data held within the store of pending scan requests for the system of FIG. 1. In this example the highest priority level has been given to the chief executive officer of the company and accordingly this pending scan request will be the next to be serviced even though it is not the oldest pending scan request.

The next highest priority level has been allocated to a scan request associated with the administrator and this will be the second scan request to be serviced. The remaining two scan requests are both associated with users having equal priority levels and accordingly the oldest of these will be serviced before the more recent scan request.

In the example of FIG. 3, the scan requests relate to normal file accesses rather than on-demand accesses. In the case of on-demand accesses, the Requestor column would be replaced by an Owner or Creator column with this information being derived from that stored by the operating system (such as Windows NT) itself.

Figure 4:
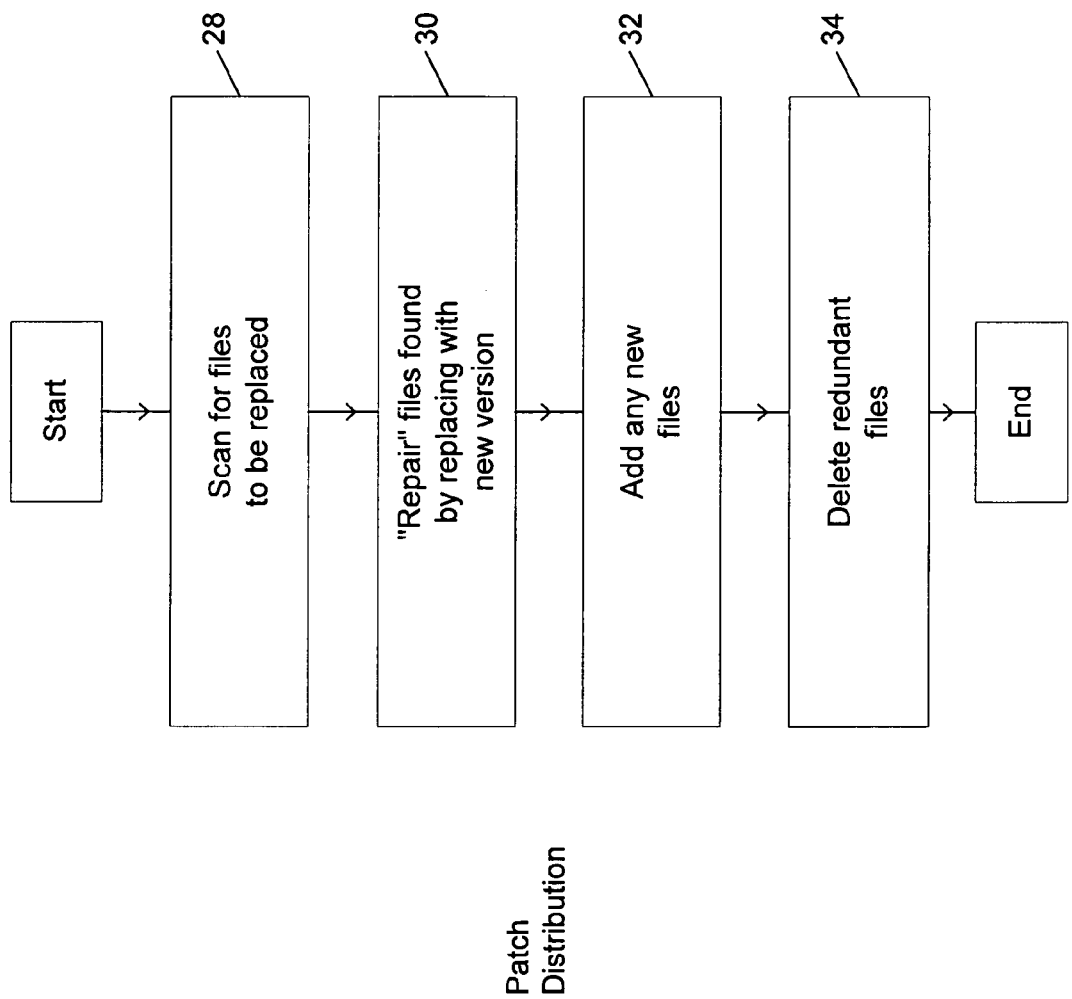
FIG. 4 is a flow diagram illustrating the selection of a next pending scan request from the store of pending scan requests of FIG. 3.

FIG. 4 is a flow diagram illustrating the selection of the next pending scan request to be serviced. At step 20 a check is made as to whether the store of pending scan requests is empty. If the store is not empty, then step 22 selects the oldest high priority scan to be the next request to scan to be serviced. This request is serviced at step 24 and then the corresponding data removed from the store at step 26 prior to return to step 20.

Figure 5:
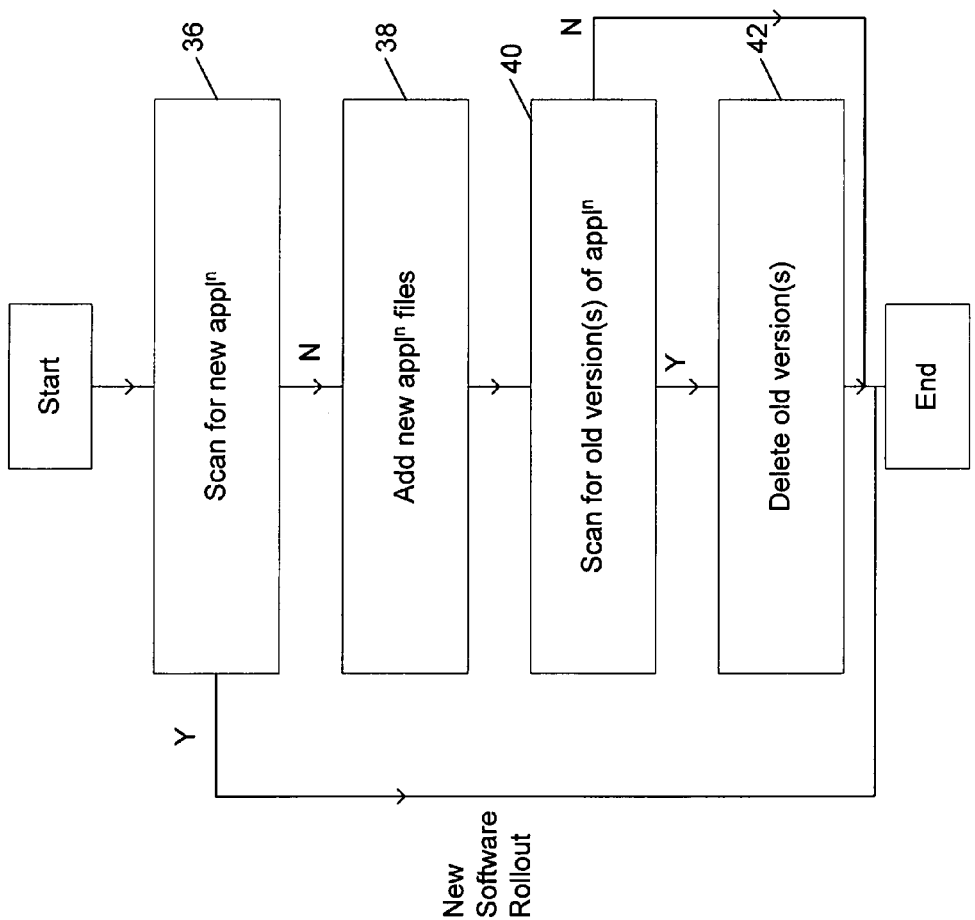
FIG. 5 schematically illustrates an anti-virus system within an e-mail server.

FIG. 5 illustrates an anti-virus or anti-spam system for use in an e-mail server. E-mail messages requiring scanning are stored into a dirty mail store 28 pending their scan and passed out of the dirty mail store 28 when they are identified as being clean of any virus infection or not possessing properties indicative of being a spam e-mail or an otherwise unwanted e-mail. When an e-mail message is written into the dirty mail store, a scan controller 30 is responsive to data within that e-mail message indicating the sender and recipient of the e-mail message to allocate a priority level to the scan request associated with that e-mail message. The mail ID, the priority level and a time stamp indicative of the time of receipt of the e-mail message are then stored within a pending scan list 32.

The scan controller 30 also operates to select the next pending scan request to be processed from the pending scan list 32 and pass this information to the scan engine 34. The scan controller 30 selects the oldest high priority scan stored within the pending scan list, subject to providing a maximum latency period for which any scan request may be left pending. The scan engine 34 then scans the e-mail message corresponding to the scan request for computer viruses using associated virus definition data 36. The scan controller 30 may also initiate scanning of the e-mail message for characteristics indicative of the e-mail message being an unwanted spam e-mail message, such as receipt of in excess of a threshold number of e-mail messages from a common sender, a common organisation, addressed to a common recipient, bearing a common title, carrying a common attachment, or including a common content. This checking for spam e-mail may also be provided by an external service outside of the anti-virus system that could be triggered by the scan controller 30 or could have its own prioritisation and pending list control system.

Once the scan engine 34 has completed its anti-virus scan, then a pass or fail signal is returned. If the mail message fails, then it may be automatically disinfected, have a portion of its content blocked or may be blocked in its entirety as well as triggering the issue of various alerts to the system administrator or possibly all users. If the e-mail message passes the scan, then it is released for further onward distribution.

Figure 6:
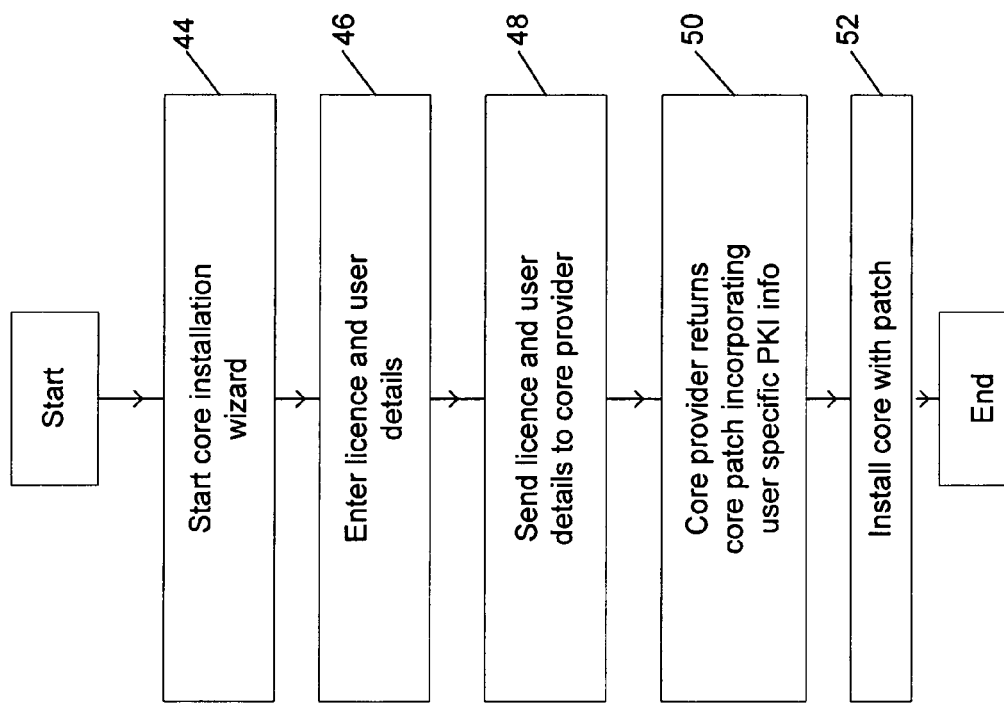
FIG. 6 is a flow diagram illustrating the allocation of priority levels within the system of FIG. 5.

FIG. 6 is a flow diagram illustrating the allocation of priority levels by the scan controller 30. At step 38, an e-mail message is received. At step 40 a priority level is allocated based upon the intended recipient of the e-mail. At step 42, a priority level is allocated based upon the sender of the e-mail. The mappings between priority levels and recipient/sender may be held within a separate user defined list. As an example, the system administrator and chief executive officer of an organisation may be given higher priority in their e-mail than a standard user. At step 44, a selection is made between the priority levels allocated at steps 40 and 42 such that the higher of these priority levels is then allocated to the e-mail message. Depending upon the particular priorities of the organisation concerned, inbound e-mail with a priority level determined based upon recipient may be allocated a range of priority levels generally higher than those associated with outbound e-mails originated within the organisation. In different circumstances, this relative difference between priorities given to inbound and outbound e-mails may be reversed. At step 46, the e-mail message ID, the priority level and a time stamp are written to the pending scan list store 32.

Figure 7:
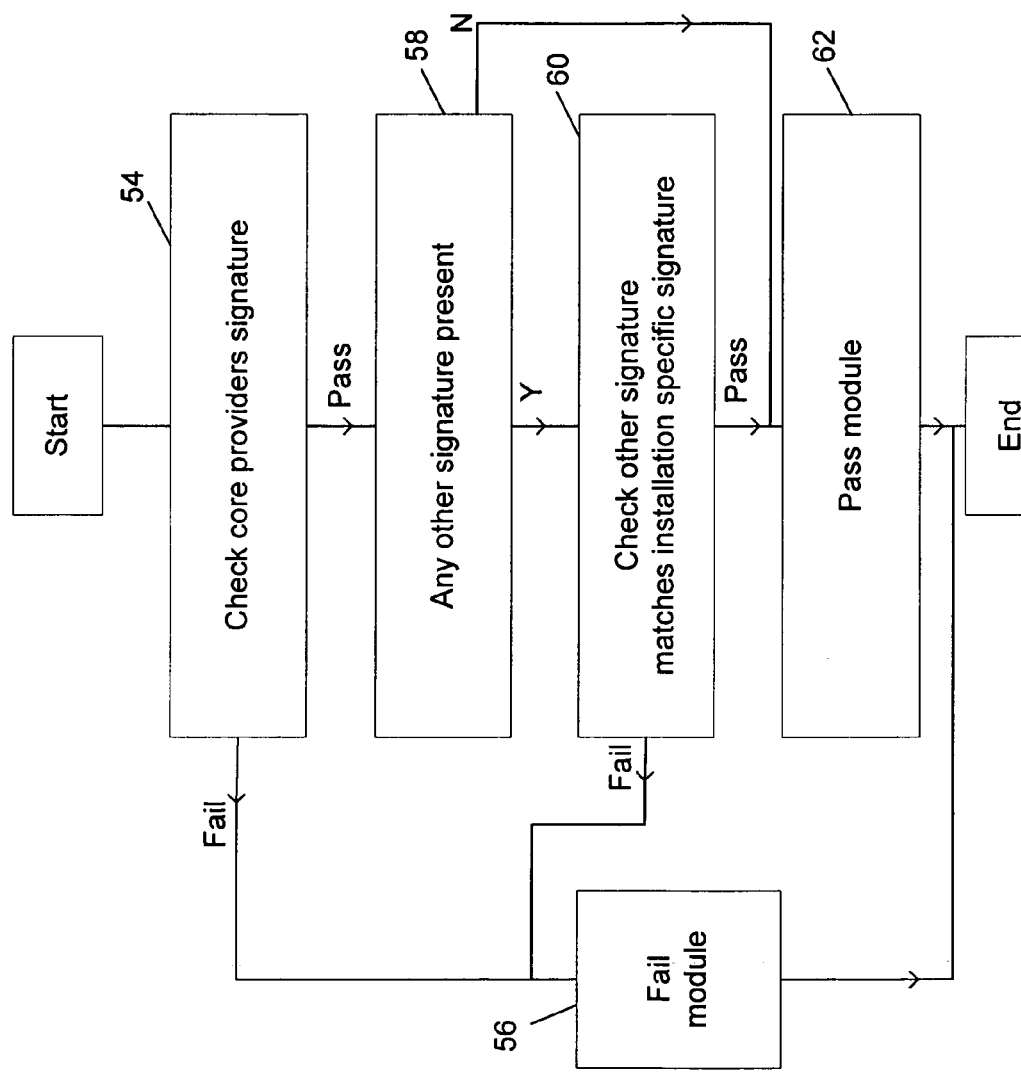
FIG. 7 is an example store of pending scan requests within an e-mail system.

FIG. 7 schematically illustrates a number of entries within the pending scan list store 32. In this example, the sender and recipient is also listed, although it will be appreciated that this data may not in practice be stored within the pending scan list store 32 which could instead solely store the allocated priority level.

In the example illustrated, the second entry in the list is given the highest priority as the recipient is the chief executive officer of the organisation concerned. The next highest priority pending scan request for an e-mail message is given to the third entry as in this case the sender is the chief executive officer of the organisation.

The next highest priority pending scan request is given to the fourth item in the list as in this case the recipient is the administrator user. The final e-mail message to be processed will in fact be the oldest item which is the first in the list.

Figure 8:
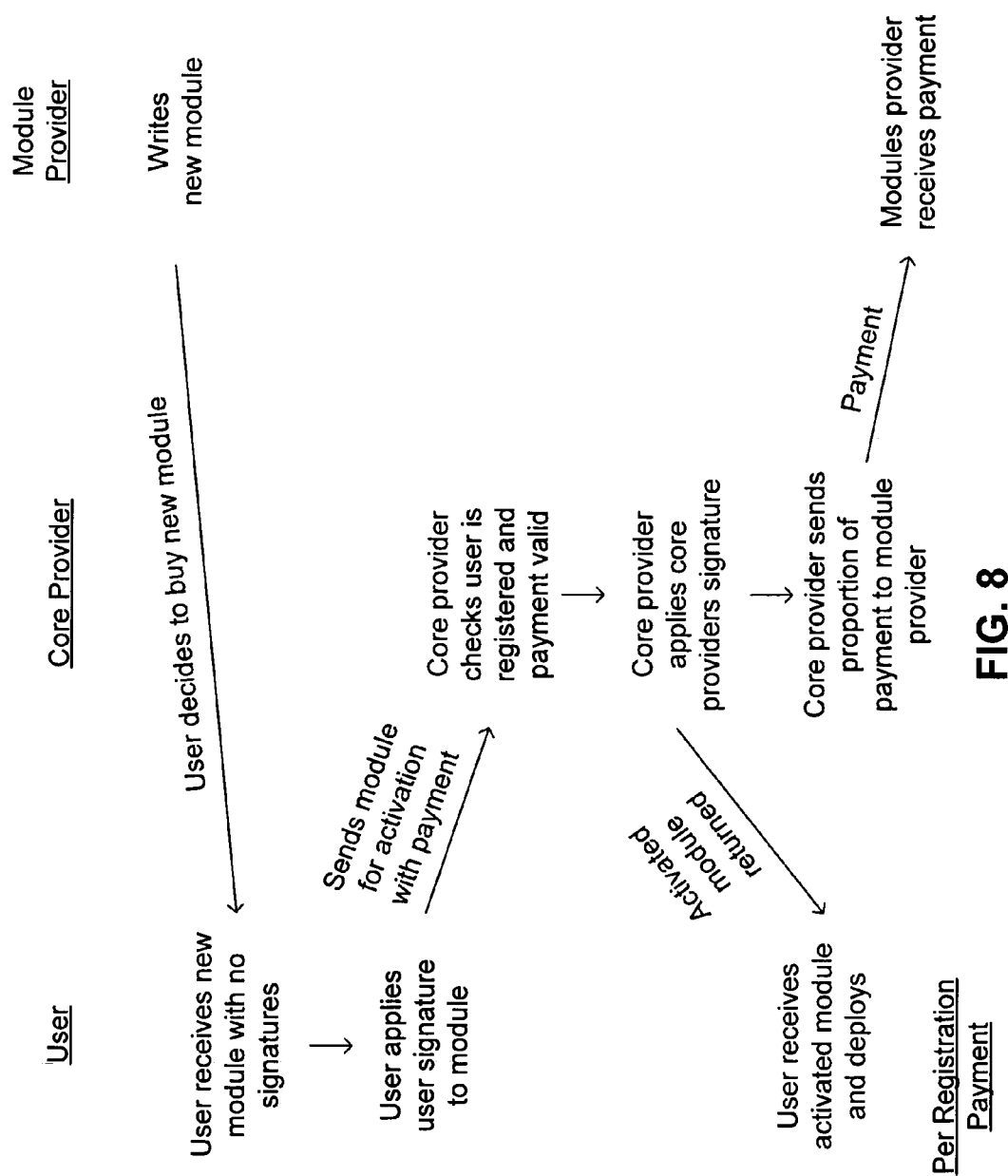
FIG. 8 is a flow diagram illustrating selection of the next pending scan request for servicing within the system of FIG. 5.

FIG. 8 is a flow diagram illustrating the selection of the next pending e-mail scan request in accordance with the system of FIG. 5. At step 38 a check is made as to whether the pending scan list store 32 is empty. If the result is that the pending scan list store 32 is not empty, then step 40 serves to find the oldest high priority scan within the list (this step may also check if any scan requests have been pending for longer than a predetermined maximum latency period and select these instead irrespective of their priority level). This scan when identified is performed at step 42 and then the entry within the pending scan list store 32 removed at step 44 prior to returning processing to step 38.

Figure 9:
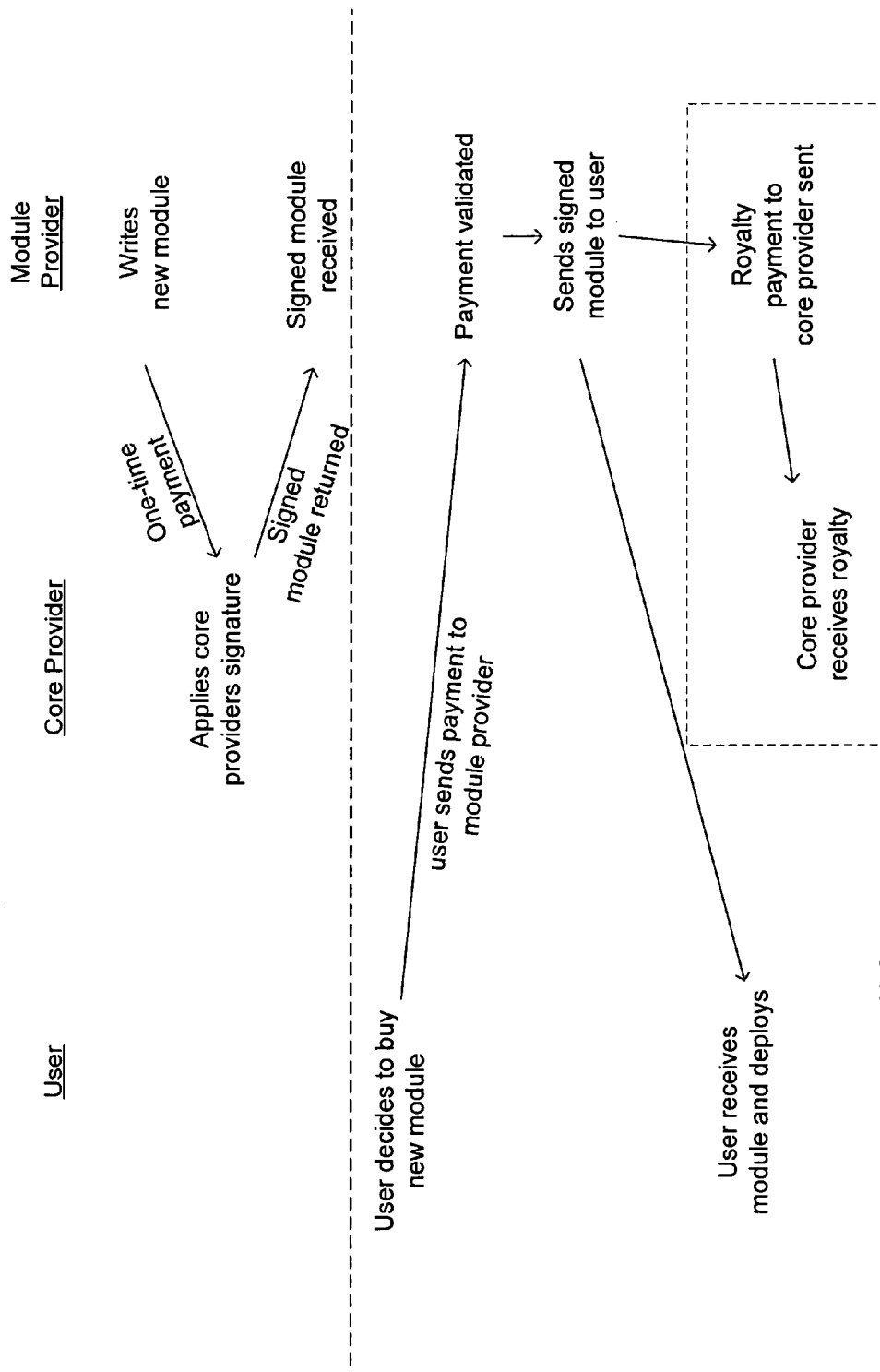
FIG. 9 schematically illustrates a general purpose computer of the type that may be used to implement the techniques described in FIGS. 1 to 8.
Figure 10:
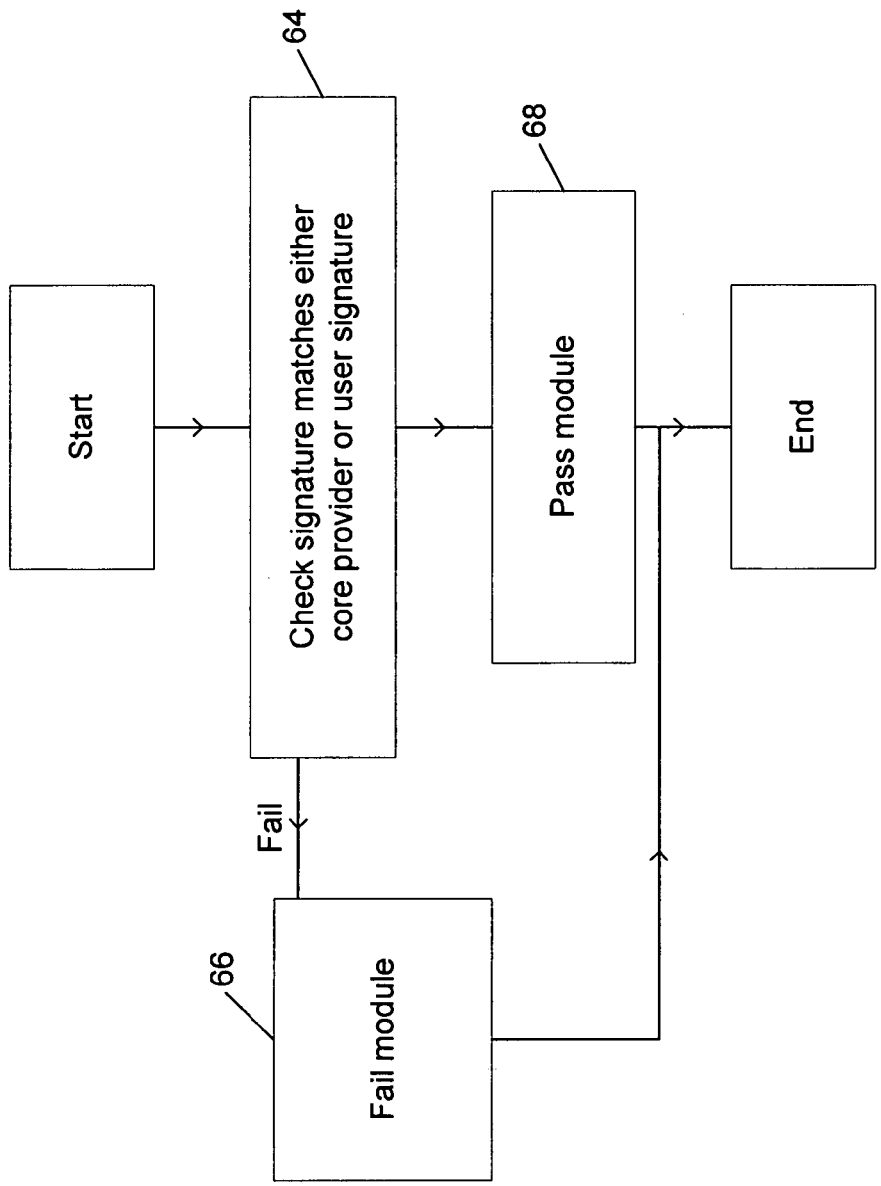
Figure 11:
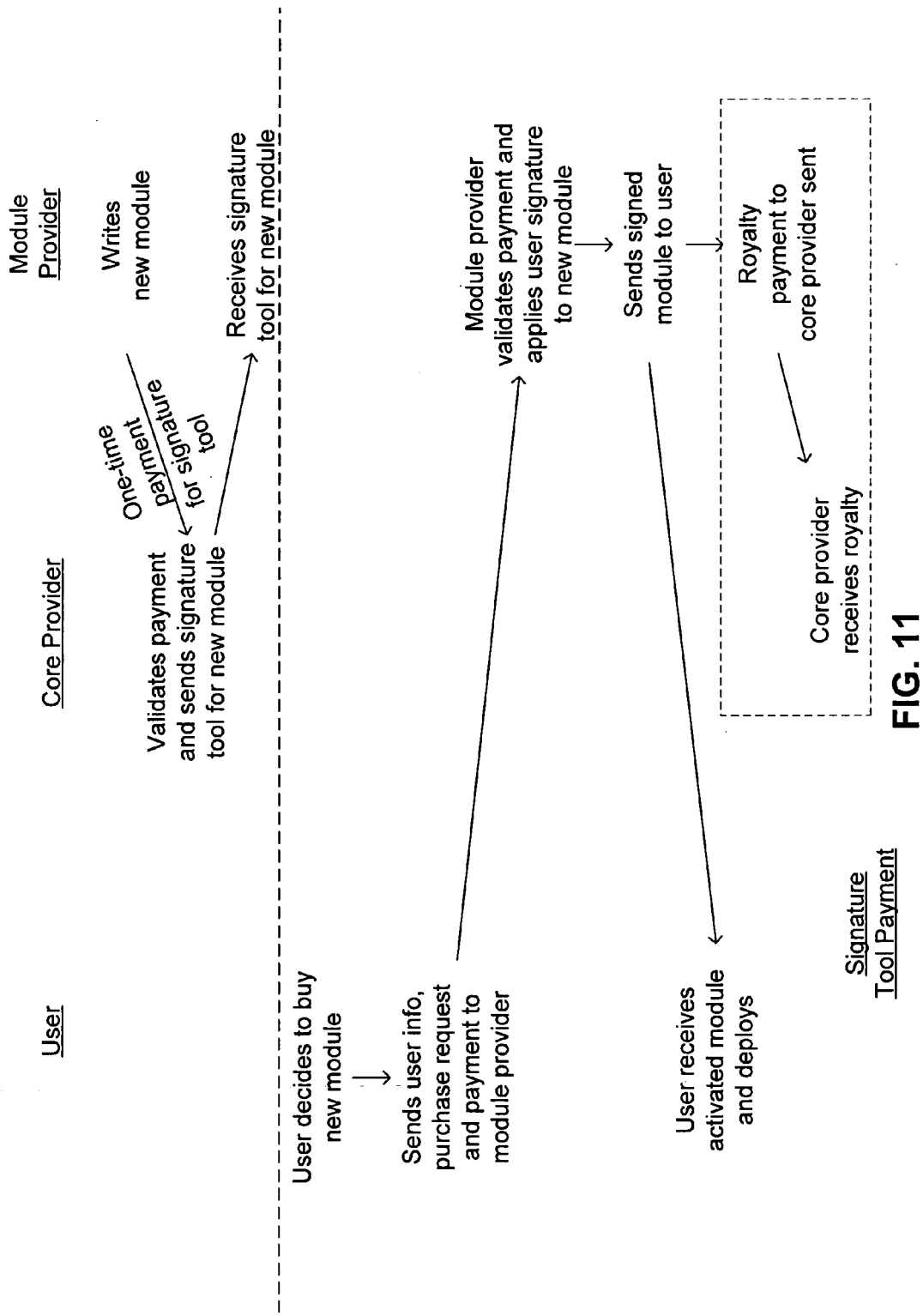
Figure 12:
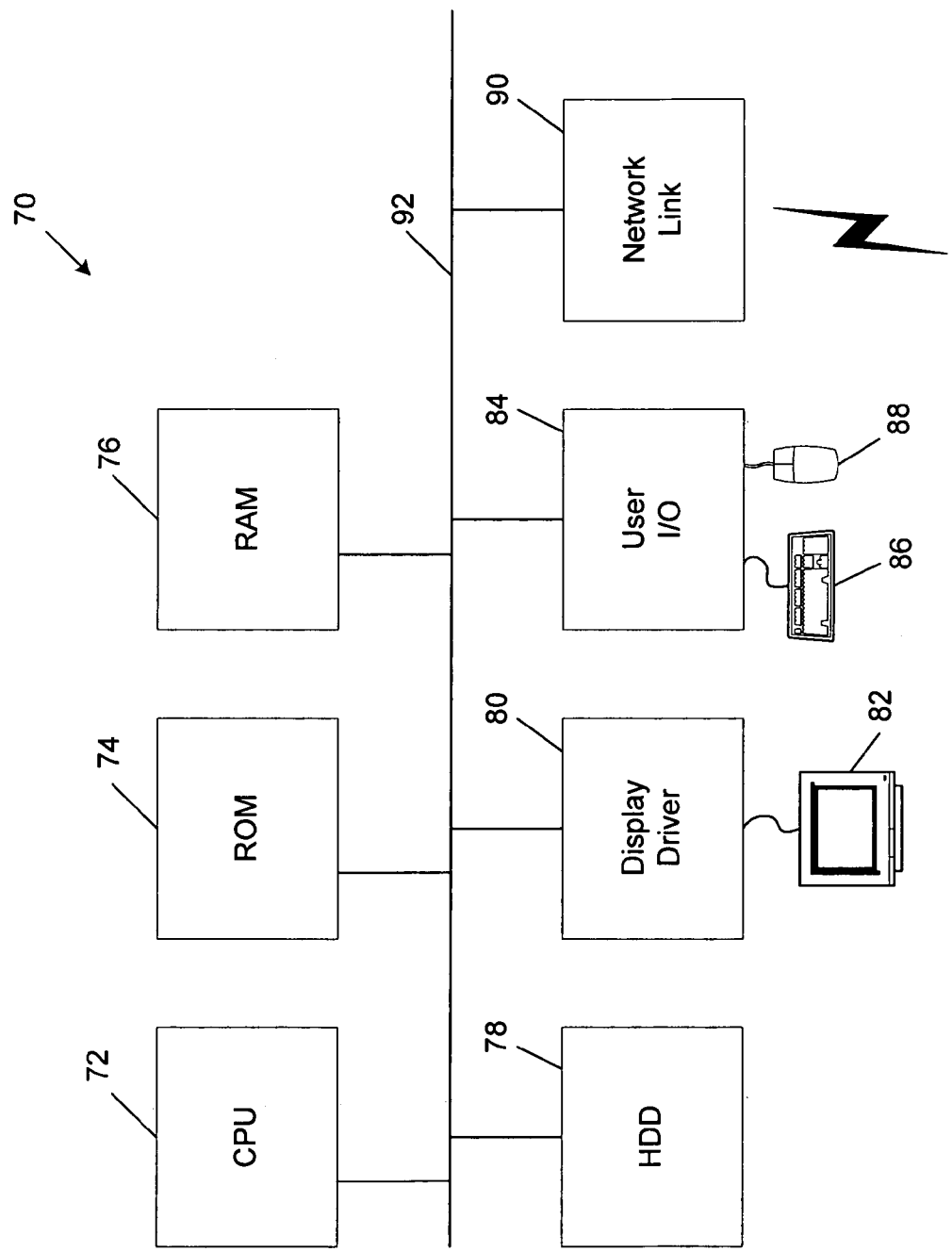

FIG. 9 schematically illustrates a general purpose computer 46 of the type which may be used to perform the above described techniques. The general purpose computer 46 includes a central processing unit 48, a read only memory 50, a random access memory 52, a hard disk drive 54, a display driver 56 and display 58, a user input/output unit 60 and keyboard 62 and mouse 64 and a network link unit 66 all coupled together via a common bus 68. In operation, the central processing unit 48 executes program instructions representing computer code routines for performing the functions described above. The computer program instructions may be stored within the read only memory 50, the random access memory 52 or upon the hard disk drive 54. User inputs to configure the operation of the system may be made by the keyboard 62 and the mouse 64 and results of the processing performed may be displayed on the display 58. File access requests upon which anti-virus scanning is to be performed may be received via the network link unit 66. This may also be the way in which e-mail messages are transferred to the system for e-mail anti-virus scanning or anti-spam measures. The computer program for controlling the general purpose computer 46 may be loaded via a computer program storage medium, such as a compact disk or floppy disk, or may be downloaded via the network link unit 66 from a remote source.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer implemented method of authorising an additional computer program module for use with a core computer program, said core computer program being installed, said method comprising the steps of:
   reading module signature data associated with said additional computer program module;
   reading core signature data and other signature data associated with said core computer program;
   wherein said other signature data is user signature data;
   comparing said module signature data with said core signature data and said user signature data; and
   refusing authorisation of said additional computer program module for use with said core computer program unless said module signature data matches at least one of said core signature data and said user signature data;
   wherein said user signature data allows a particular user to authorize said additional computer program module for use with said installed core computer program;
   wherein said user signature data is utilized to authorize said additional computer program module which is from a third party for use with said core computer program.

2. A method as claimed in claim 1, wherein said additional computer program module is refused authorisation for use with said core computer program unless said module signature data matches both of said core signature data and said user signature data.

3. A method as claimed in claim 1, wherein said module signature data, said core signature data and said user signature data include public key infrastructure signatures.

4. A method as claimed in claim 1, wherein said user signature data is associated with said core computer program upon installation of said core computer program.

5. A method as claimed in claim 4 wherein said user signature data is embedded within said core computer program.

6. A method as claimed in claim 1, wherein said user signature data is embedded within said core computer program by applying a user specific patch to said core computer program.

7. A method as claimed in claim 1, wherein said core signature data is associated with said core computer program upon generation of said core computer program.

8. A method as claimed in claim 7, wherein said core signature data is embedded within said core computer program.

9. A method as claimed in claim 1, wherein said core computer program is an anti-virus computer program.

10. A method as claimed in claim 9, wherein said anti-virus computer program operates with at least one updateable anti-virus computer program module.

11. A method as claimed in claim 9, wherein said additional computer program module does not relate to anti-virus protection.

12. A method as claimed in claim 1, wherein said additional computer program module provides functionality independent of that of said core computer program.

13. A method as claimed in claim 1, wherein said additional computer program module is operable to patch an installed computer program.

14. A method as claimed in claim 1, wherein said additional computer program module is operable to install another computer program.

15. A method of generating an additional computer program module for use with a core computer program when authorised in accordance with the method of claim 1, said method comprising the steps of:
   writing said additional computer program module;
   receiving new user information from a new user of said additional computer program module;
   generating user signature data specific to said new user in dependence upon said new user information;
   associating said user signature data with said additional computer program module; and
   providing said additional computer program module with associated user signature data to said new user.

16. A method as claimed in claim 15, wherein said step of generating uses a tool produced by a provider of said core computer program.

17. A method as claimed in claim 16, wherein said step of associating uses a tool produced by a provider of said core computer program.

18. A method of generating an additional computer program module for use with a core computer program when authorised in accordance with the method of claim 1, said method comprising the steps of:
   writing said additional computer program module;
   generating signature data specific to said additional computer program module in dependence upon said additional computer program module using a tool produced by a provider of said core computer program;
   associating said signature data with said additional computer program module; and
   providing said additional computer program module with associated signature data to said new user.

19. A method of generating an additional computer program module for use with a core computer program when authorised in accordance with the method of claim 1, said method comprising the steps of:
   writing said additional computer program module;
   providing said additional computer program module to a new user;
   said new user associating user signature data with said additional computer program module;
   providing said additional computer program module and associated user signature data to a provider of said core computer program;
   said provider of said core computer program associating core signature data with said additional computer program module and associated user signature data;

providing said additional computer program module and associated user signature data and core signature data to said new user.

20. A computer implemented method of authorising an additional computer program module for use with a core computer program, said core computer program being installed, said method comprising the steps of:

reading module signature data associated with said additional computer program module;

reading core signature data and other signature data associated with said core computer program;

wherein said other signature data is user signature data;

comparing said module signature data with said core signature data and said user signature data; and refusing authorisation of said additional computer program module for use with said core computer program unless said module signature data matches at least one of said core signature data and said user signature data;

wherein said user signature data allows a particular user to authorize said additional computer program module for use with said installed core computer program;

wherein said user signature data is utilized to authorize said additional computer program module which is generated by said user for use with said core computer program.

21. A computer implemented method of authorising an additional computer program module for use with a core computer program, said core computer program being installed, said method comprising the steps of:

reading module signature data associated with said additional computer program module;

reading core signature data and other signature data associated with said core computer program;

wherein said other signature data is user signature data;

comparing said module signature data with said core signature data and said user signature data; and refusing authorisation of said additional computer program module for use with said core computer program unless said module signature data matches at least one of said core signature data and said user signature data;

wherein said user signature data allows a particular user to authorize said additional computer program module for use with said installed core computer program;

wherein said core computer program keeps a list of module providers which have been previously authorized by said user signature data, such that said user signature data becomes associated with additional computer program modules provided by module providers indicated on said list.

* * * * *